(12) United States Patent
Sbabo et al.

(10) Patent No.: US 11,498,670 B2
(45) Date of Patent: Nov. 15, 2022

(54) COAXIAL SPLIT TORQUE GEAR BOX

(71) Applicant: SIKORSKY AIRCRAFT CORPORATION, Stratford, CT (US)

(72) Inventors: Thomas L. Sbabo, Hamden, CT (US); David A. Darrow, Jr., Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1293 days.

(21) Appl. No.: 15/580,771

(22) PCT Filed: Aug. 2, 2016

(86) PCT No.: PCT/US2016/045129
§ 371 (c)(1),
(2) Date: Dec. 8, 2017

(87) PCT Pub. No.: WO2017/069830
PCT Pub. Date: Apr. 27, 2017

(65) Prior Publication Data
US 2018/0222578 A1  Aug. 9, 2018

Related U.S. Application Data

(60) Provisional application No. 62/200,866, filed on Aug. 4, 2015.

(51) Int. Cl.
*F16H 1/22* (2006.01)
*B64C 27/12* (2006.01)
(Continued)

(52) U.S. Cl.
CPC ............... *B64C 27/12* (2013.01); *B64C 27/10* (2013.01); *F16H 1/22* (2013.01); *F16H 1/222* (2013.01); *F16H 48/06* (2013.01)

(58) Field of Classification Search
CPC . B64C 27/10; B64C 27/12; F16H 1/22; F16H 1/222
See application file for complete search history.

(56) References Cited

U.S. PATENT DOCUMENTS 5,601,257 A * 2/1997 McKann ................. B64C 27/10
416/169 R
5,807,202 A * 9/1998 Sammataro ......... F16H 37/0826
475/9
(Continued)

OTHER PUBLICATIONS

PCT/US2016/045129—ISR/WO, dated Apr. 14, 2017; 14 pages.

*Primary Examiner* — Philip J Bonzell
*Assistant Examiner* — Tye William Abell
(74) *Attorney, Agent, or Firm* — Michael Best & Friedrich LLP

(57) ABSTRACT

A gearbox system includes a first drive gear rotatable about an axis of rotation and a second drive gear disposed coaxial with the first drive gear and rotatable about the axis of rotation. An input shaft provides a first torque and includes an input gear. Driving pinions are operably connected to the input gear and positioned between the first drive gear and the second drive gear compliantly along a direction parallel to the axis of rotation. Each driving pinion drives the first drive gear in a first direction about the axis of rotation and drives the second drive gear in a second direction opposite the first direction about the axis of rotation. Each driving pinion transfers an equal second torque to the first drive gear and the second drive gear.

11 Claims, 5 Drawing Sheets

(51) Int. Cl.
*B64C 27/10* (2006.01)
*F16H 48/06* (2006.01)

(56) References Cited

U.S. PATENT DOCUMENTS

| | | | | |
|---|---|---|---|---|
| 7,413,142 B2 * | 8/2008 | Gmirya | ................... | B64C 27/14 244/17.23 |
| 7,621,480 B2 * | 11/2009 | Darrow, Jr. | ............... | B64C 7/00 416/41 |
| 8,899,926 B2 * | 12/2014 | Garcia | ................... | B64D 35/00 416/129 |
| 2015/0060596 A1 * | 3/2015 | Garcia | .................... | B64C 27/10 244/17.23 |

* cited by examiner

COAXIAL SPLIT TORQUE GEAR BOX

CROSS REFERENCE TO RELATED APPLICATIONS

This application is a National Stage application of PCT/US2016/045129, filed Aug. 2, 2016, which claims the benefit of U.S. Provisional Patent Application No. 62/200,866, filed Aug. 4, 2015, both of which are incorporated by reference in their entirety herein.

BACKGROUND

The subject matter disclosed herein relates to the art of gearbox systems and, more specifically, to gearbox systems for rotary wing aircraft.

A gearbox system of a rotary wing aircraft transfers power from an engine, or multiple engines, for example, a turbine engine, to the rotor system. A typical system directs power from the engine to a single rotor system including a plurality of rotor blades. Since rotational velocity of the rotor is typically lower than the rotational velocity of the engine, the gearbox is used to reduce the rotational velocity of the turbine engine. Torque is subsequently increased through a series of intermediate gear stages and shafts, with an output velocity provided to the rotor system.

In other rotary wing aircraft with more complex rotor systems, the complexity of the gearbox typically also increases. For example, some rotary wing aircraft have two coaxial counter rotating main rotor assemblies. As such, the gearbox must be configured to transfer engine power to both rotor assemblies at the required directions of rotation, requiring two large final reduction stages. Further in in some aircraft, the gearbox is further utilized to transfer power to a propeller assembly, typically located at a tail of the aircraft, to provide additional forward thrust. Consequently, the typical gearbox for such an aircraft is large and heavy, often encroaching on available passenger or cargo cabin space, reducing capacity.

BRIEF SUMMARY

In one embodiment, a gearbox system includes a first drive gear rotatable about an axis of rotation and a second drive gear disposed coaxial with the first drive gear and rotatable about the axis of rotation. An input shaft provides a first torque and includes an input gear. Driving pinions are operably connected to the input gear and positioned between the first drive gear and the second drive gear compliantly along a direction parallel to the axis of rotation. Each driving pinion drives the first drive gear in a first direction about the axis of rotation and drives the second drive gear in a second direction opposite the first direction about the axis of rotation. Each driving pinion transfers an equal second torque to the first drive gear and the second drive gear.

Additionally or alternatively, in this or other embodiments an idler pinion is positioned between and engaged with the first drive gear and the second drive gear.

Additionally or alternatively, in this or other embodiments the idler pinion is configured to transfer a differential torque between a first torque transferred to the first drive gear and a second torque transferred to the second drive gear.

Additionally or alternatively, in this or other embodiments the idler pinion is configured to ensure that the first drive gear and the second drive gear rotate at a same rotational speed about the axis of rotation.

Additionally or alternatively, in this or other embodiments one or more transfer shafts are operably connected to the input shaft and each of the first drive gear and the second drive gear. Each transfer shaft includes a transfer gear meshed with the input gear and a driving pinion operably connected to the transfer gear.

Additionally or alternatively, in this or other embodiments the first drive gear and the second drive gear are face gears.

In another embodiment, a drive system for a dual coaxial counter rotating assembly includes an engine outputting a first torque via an input shaft and a gearbox assembly operably connected to the input shaft including a first drive gear rotatable about an axis of rotation to drive a first rotating assembly about the axis of rotation and a second drive gear positioned coaxial with the first drive gear and rotatable about the axis of rotation to drive a second rotating assembly about the axis of rotation. Driving pinions are operably connected to the input shaft and positioned between the first drive gear and the second drive gear compliantly along a direction parallel to the axis of rotation. Each driving pinion drives the first drive gear in a first direction about the axis of rotation and drives the second drive gear in a second direction opposite the first direction about the axis of rotation. Each driving pinion transfers an equal second torque to the first drive gear and the second drive gear.

Additionally or alternatively, in this or other embodiments an idler pinion is located between and engaged with the first drive gear and the second drive gear.

Additionally or alternatively, in this or other embodiments the idler pinion is configured to transfer a differential torque between a first torque transferred to the first drive gear and a second torque transferred to the second drive gear.

Additionally or alternatively, in this or other embodiments the idler pinion is configured to ensure that the first drive gear and the second drive gear rotate at a same rotational speed about the axis of rotation.

Additionally or alternatively, in this or other embodiments one or more transfer shafts are operably connected to the input shaft and each of the first drive gear and the second drive gear. Each transfer shaft includes a transfer gear meshed with the input gear and a driving pinion operably connected to the transfer gear.

Additionally or alternatively, in this or other embodiments the first drive gear and the second drive gear are face gears.

In yet another embodiment, a rotary wing aircraft includes an airframe and a rotor assembly including a first rotor rotatable about a rotor axis in a first direction and a second rotor coaxial with the first rotor and rotatable about the rotor axis in a second direction opposite the first direction. A drive system is operably connected to the rotor assembly including an engine outputting a first torque via an input shaft. A gearbox assembly is operably connected to the input shaft and includes a first drive gear rotatable about the rotor axis to drive the first rotor about the rotor axis and a second drive gear disposed coaxial with the first drive gear and rotatable about the rotor axis to drive a the second rotor about the rotor axis. At least one driving pinion is operably connected to the input shaft and is positioned between the first drive gear and the second drive gear compliantly along a direction parallel to the axis of rotation. Each driving pinion drives the first drive gear in a first direction about the axis of rotation and drives the second drive gear in a second direction opposite the first direction about the axis of rotation. Each driving pinion transfers an equal second torque to the first drive gear and the second drive gear. An idler pinion is positioned between and engaged with the first drive gear and the second drive gear to transfer a differential torque between a first torque transferred to the first drive gear and a second torque transferred to the second drive gear.

Additionally or alternatively, in this or other embodiments the idler pinion is configured to extract power from the first drive gear and second drive gear to power a translation thrust system of the aircraft.

Additionally or alternatively, in this or other embodiments one or more transfer shafts are operably connected to the input shaft and each of the first drive gear and the second drive gear. Each transfer shaft includes a transfer gear meshed with the input gear and a driving pinion operably connected to the transfer gear.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
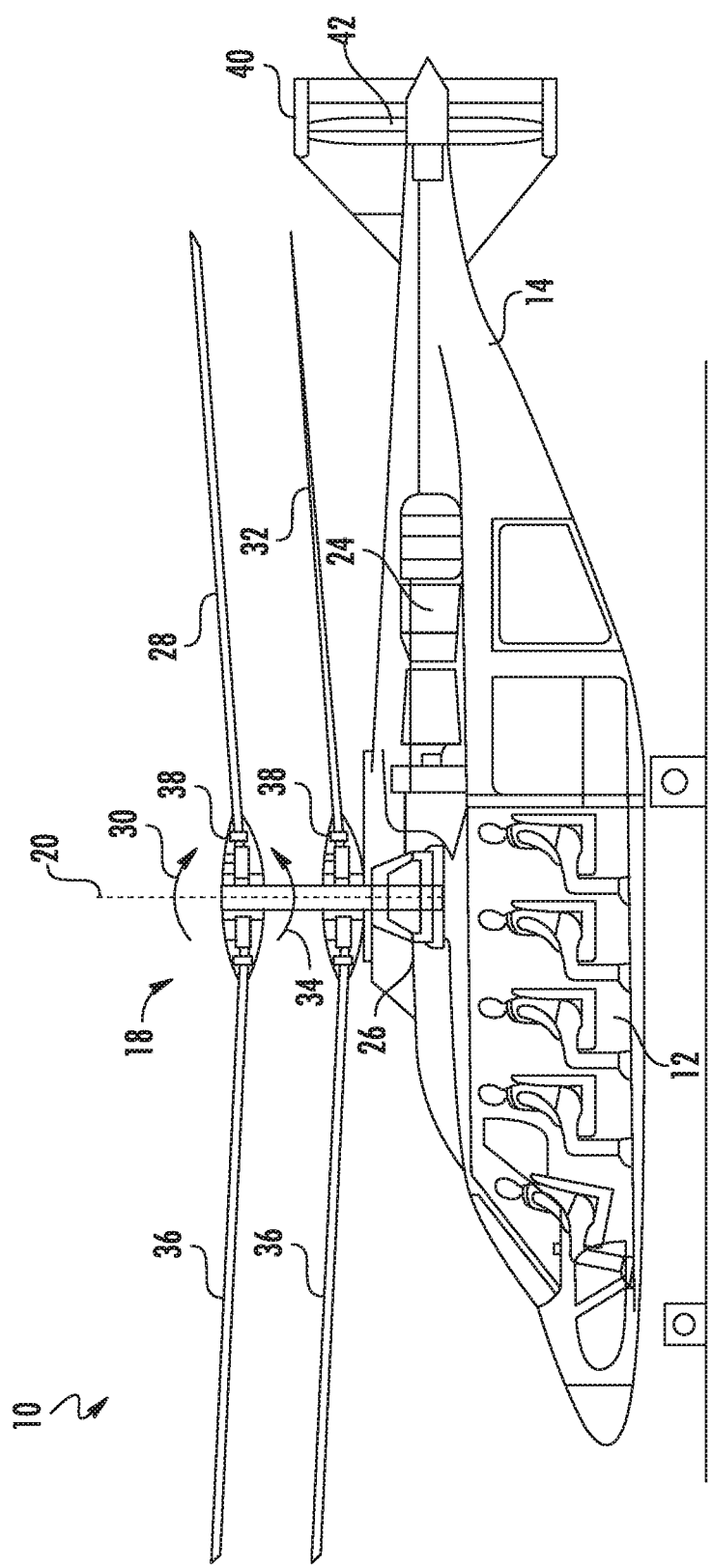
FIG. 1 is a schematic view of an embodiment of a rotary wing aircraft.

Shown in FIG. 1 is schematic view of an embodiment of a rotary wing aircraft, in this embodiment a helicopter 10. The helicopter 10 includes an airframe 12 with an extending tail 14. A dual, counter rotating coaxial main rotor assembly 18 is located at the airframe 12 and rotates about a main rotor axis 20. The main rotor assembly 18 is driven by a power source, for example, an engine 24 via a gearbox 26. The main rotor assembly 18 includes an upper rotor assembly 28 driven in a first direction 30 about the main rotor axis 20, and a lower rotor assembly 32 driven in a second direction 34 about the main rotor axis 20, opposite to the first direction 30. While, in FIG. 1, the first direction 30 is illustrated as counter-clockwise and the second direction 34 is illustrated as counter clockwise, it is to be appreciated that in some embodiments the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the helicopter 10 further includes a translational thrust system 40 located at the extending tail 14 to provide translational thrust for the helicopter 10. The translational thrust system 40 includes a propeller rotor 42 connected to and driven by the engine 24 via the gearbox 26. While shown in the context of a pusher-prop configuration, it is understood that the propeller rotor 42 could also be more conventional puller prop or could be variably facing so as to provide torque in addition to or instead of translational thrust.

Figure 2:
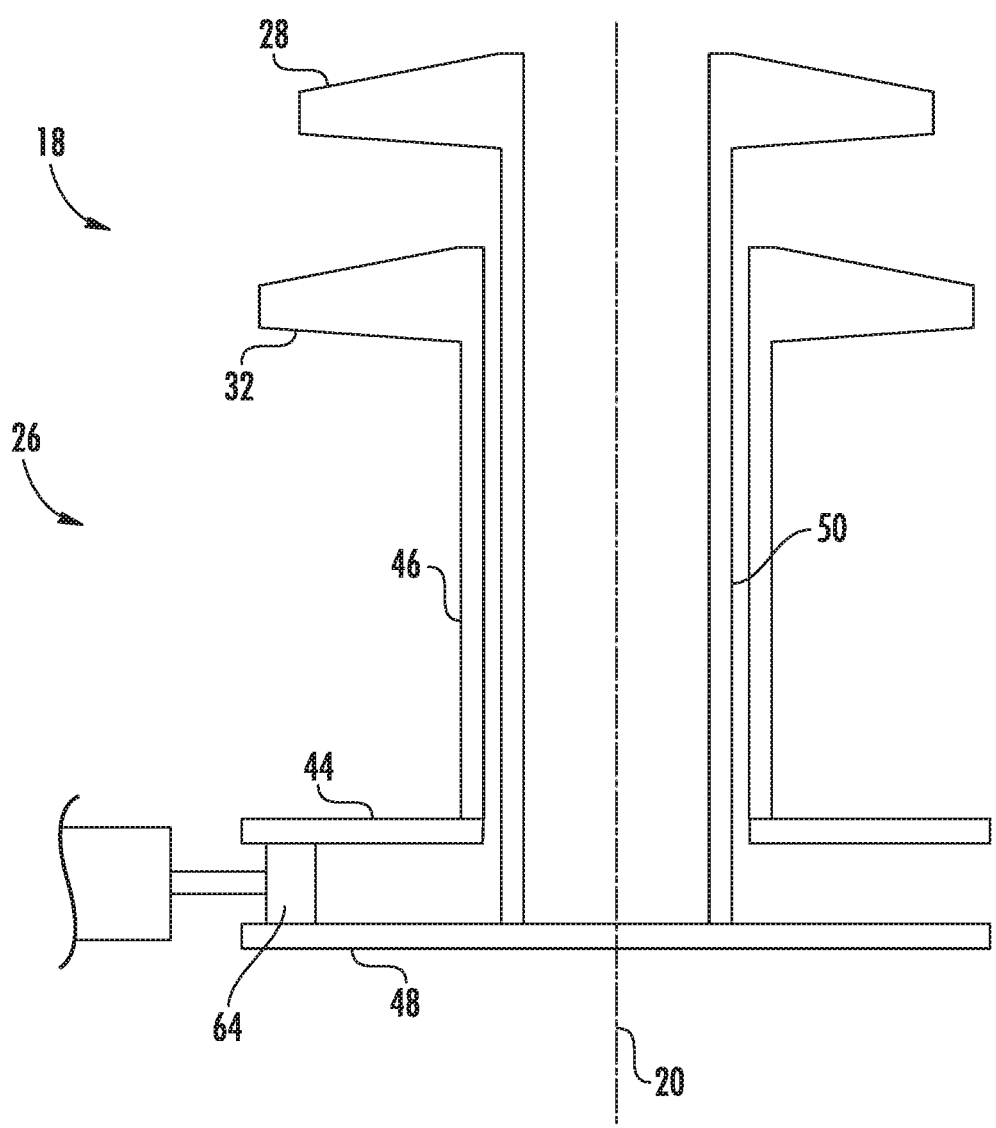
FIG. 2 is a cross-sectional view of an embodiment of a gearbox assembly.

Shown in FIG. 2 is a cross-sectional view of an embodiment of a main gearbox 26 connected to and driving a main rotor assembly 18. The gearbox 26 includes an upper drive gear 44 located at the main rotor axis 20 and connected to the lower rotor assembly 32 via a lower rotor shaft 46 extending along the main rotor axis 20. A lower drive gear 48 is located at the main rotor axis 20 and is connected to the upper rotor assembly 28 via an upper rotor shaft 50 extending along the main rotor axis 20, and through an interior of the lower rotor shaft 46. In the embodiment shown the upper drive gear 44 and the lower drive gear 48 are face gears, but in other embodiments, other types of gears such as bevel gears may be utilized.

Figure 3:
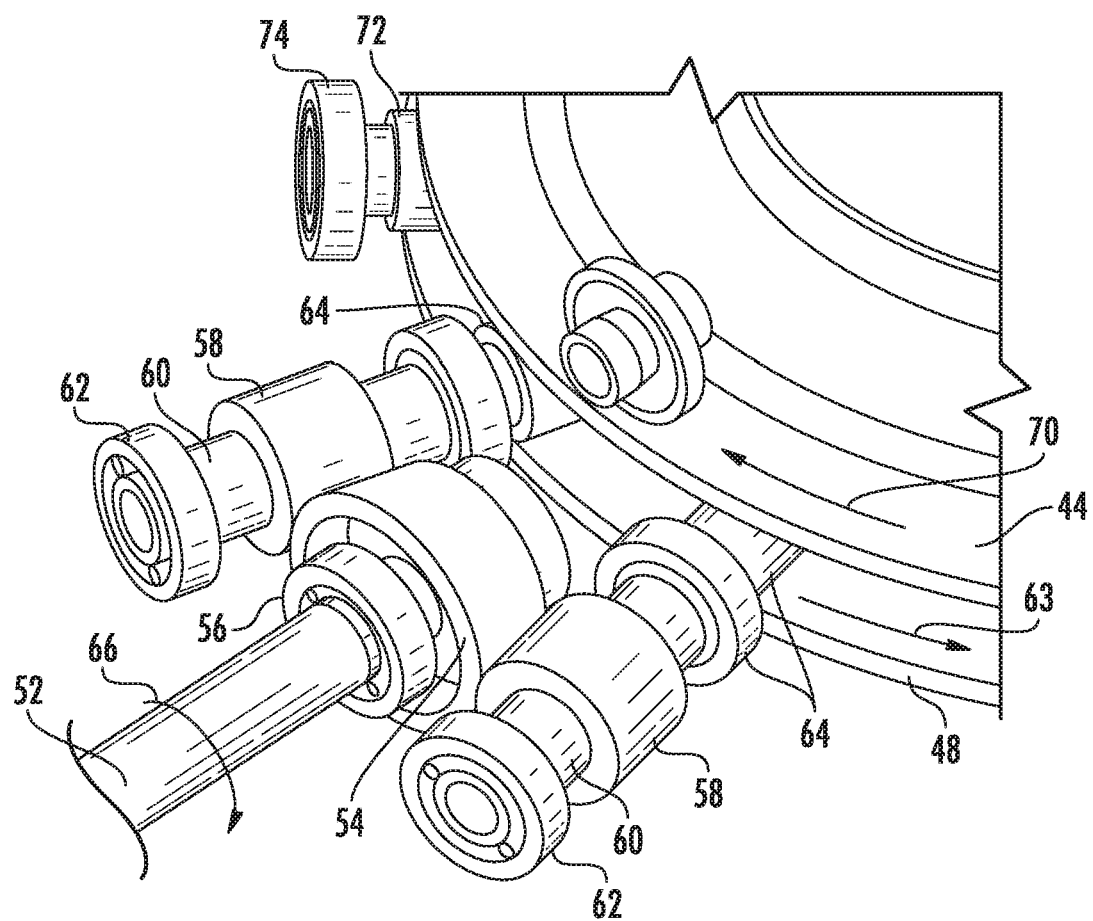
FIG. 3 is a partial perspective view of an embodiment of a gearbox assembly.

Referring now to FIG. 3, torque and rotational speed are provided to the gearbox 26 via input shaft 52 that transmits the torque and rotational speed from the engine 24 to an input gear 54 disposed at the input shaft 52. The input shaft 52 is supported by an input shaft bearing 56. The input gear 54 meshes with two transfer gears 58 located, in some embodiments, at opposing sides of the input gear 54, splitting an input torque 66 provided along the input shaft 52. The transfer gear 58 is located at a transfer shaft 60 supported by a transfer shaft bearing 62.

A driving pinion 64 is located at the transfer shaft 60 and is positioned between the upper drive gear 44 and the lower drive gear 48. Each driving pinion 64 is meshed with the upper drive gear 44 and lower drive gear 48, and transmits torque from the input gear 54, via their respective transfer gear 58, to the upper drive gear 44 and lower drive gear 48. The driving pinions 64 are positioned cantilevered between the upper drive gear 44 and the lower drive gear 48, in some embodiments supported by the transfer shaft bearing 62. The cantilever mounting of the driving pinions 64 supported by the transfer shaft bearings 62 allows the driving pinions 64 to float relative to the upper drive gear 44 and the lower drive gear 48, by compliance both circumferentially and along the main rotor axis 20. The driving pinions 64 drive rotation of the upper drive gear 44 and the lower drive gear 48 about an axis if rotation, for example, the main rotor axis 20, in opposite directions. For example, in some embodiments, the upper drive gear 44 is driven in a first direction 68 about the main rotor axis 20 and the lower drive gear 48 is driven in a second direction 70, opposite to the first direction 68.

Figure 4:
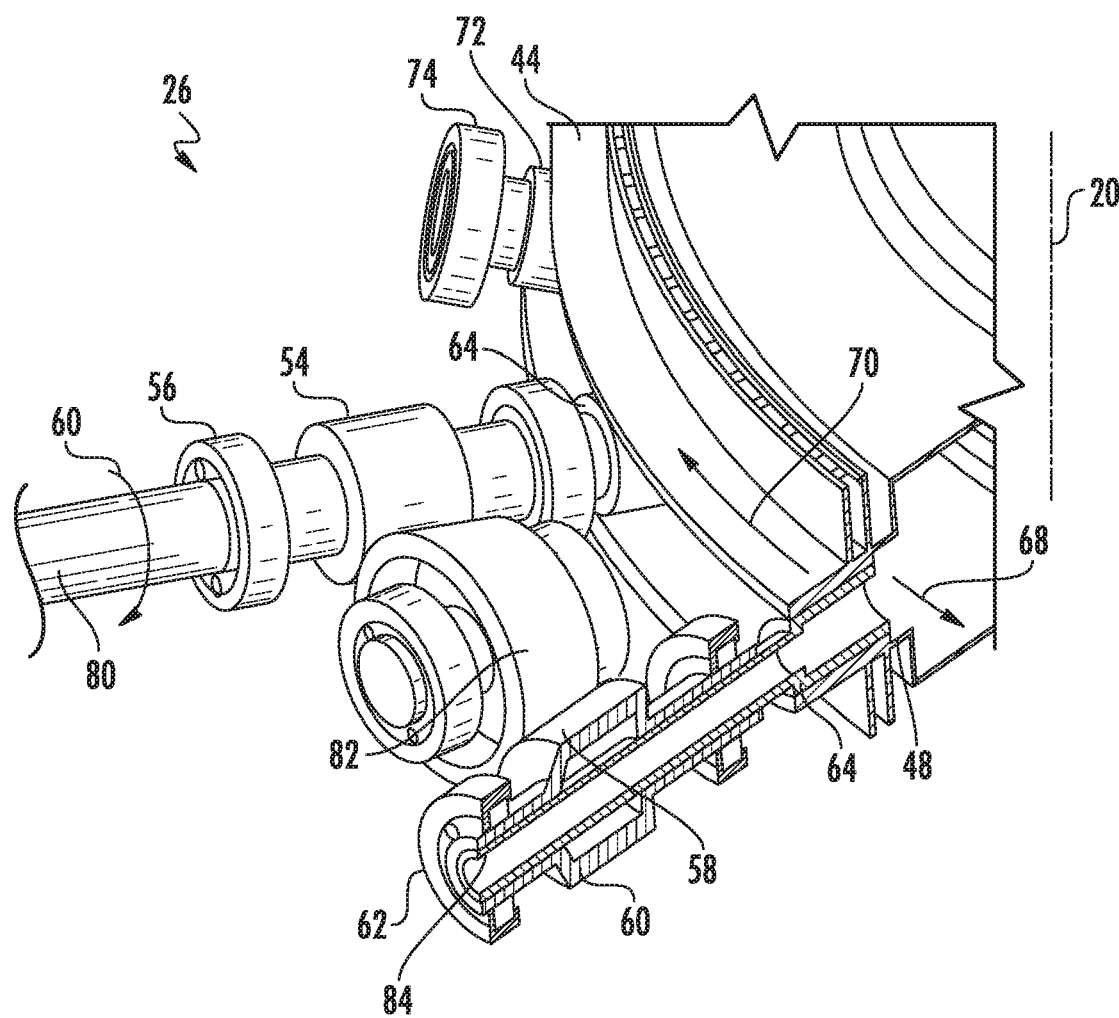
FIG. 4 is a partial perspective view of another embodiment of a gearbox assembly.

Referring to FIG. 4, in another embodiment torque and rotational speed are provided to the gearbox 26 via input shaft 80 that transmits the torque and rotational speed from the engine 24 to an input gear 54 disposed at the input shaft 80. The input shaft 80 is supported by an input shaft bearing 56. The input gear 54 meshes with a transfer idler 82, which in turn meshes with a transfer gear 58 located is located at a transfer shaft 60 supported by a transfer shaft bearing 62.

A driving pinion 64 is located at each of the input shaft 80 and the transfer shaft 60. The driving pinions 64 effectively split an input torque 66 provided along the input shaft 80. Each driving pinion 64 is positioned between the upper drive gear 44 and the lower drive gear 48 and is meshed with the upper drive gear 44 and lower drive gear 48, to transmit torque from the input gear 54 to the upper drive gear 44 and lower drive gear 48. The driving pinions 64 are positioned cantilevered between the upper drive gear 44 and the lower drive gear 48, in some embodiments supported by in position via spline 84 connection to the input shaft 80 or transfer shaft 60. The cantilever mounting of the driving pinions 64 allows the driving pinions 64 to float relative to the upper drive gear 44 and the lower drive gear 48, by compliance both circumferentially and along the main rotor axis 20. The driving pinions 64 drive rotation of the upper drive gear 44 and the lower drive gear 48 about an axis if rotation, for example, the main rotor axis 20, in opposite directions. For example, in some embodiments, the upper drive gear 44 is driven in a first direction 68 about the main rotor axis 20 and the lower drive gear 48 is driven in a second direction 70, opposite to the first direction 68. While the embodiments of FIG. 3 and FIG. 4 illustrate two driving pinions 64, it is to be appreciated that in other embodiments, different quantities of driving pinions 64, for example one, three or four driving pinions 64, may be utilized to arrive at a selected torque split.

One or more idler pinions 72 are located between the upper drive gear 44 and the lower drive gear 48, and meshed with both drive gears 44, 48. As will be described further with reference to FIGS. 5 and 6, the idler pinions 72 are rigidly mounted and supported by idler bearings 74 and are not permitted to positionally float as the driving pinions 64 are. The idler pinions 72 provide timing for the upper drive gear 44 and the lower drive gear 48, so the upper drive gear 44 and the lower drive gear 48 rotate at the same rate about the main rotor axis 20. The idler pinions 72 further transfer differential torque in the event of yaw commands to the main rotor assembly 18.

Figure 5:
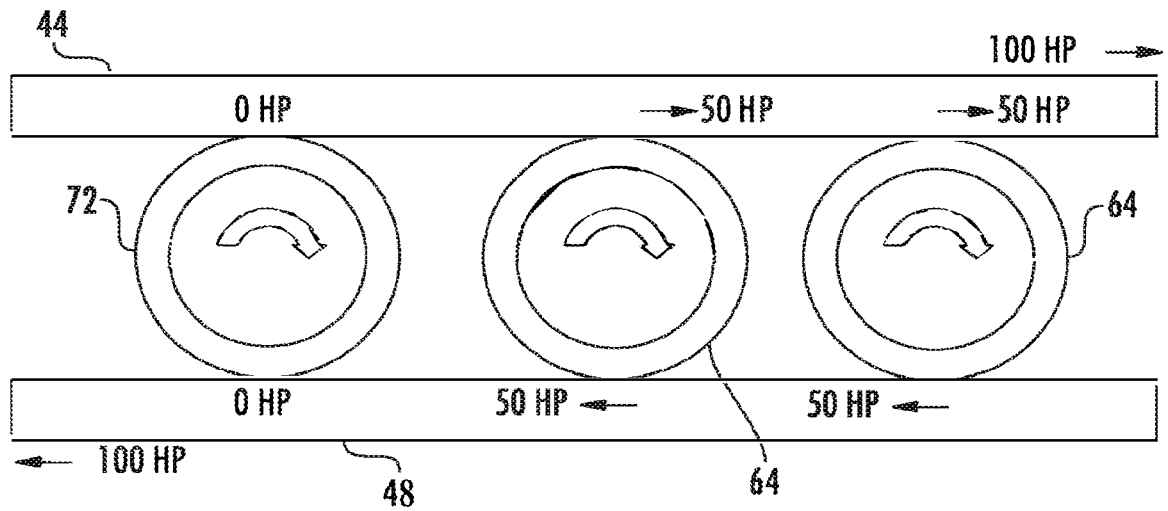
FIG. 5 is a schematic view of operation of an embodiment of a gearbox.

Shown in FIG. 5 is a schematic of operation of the main gearbox 26 during normal operation. In such operation, an equal amount of torque is transmitted to each of the upper drive gear 44 and the lower drive gear 48. For example, each driving pinion 64 transmits 100 HP into the system, with 50 HP being transmitted to each of the upper drive gear 44 and the lower drive gear 48. In this operating condition, since the entire torque is transmitted equally to the upper drive gear 44 and lower drive gear 48, the idler pinion 72 merely performs a timing function and is not loaded.

Figure 6:
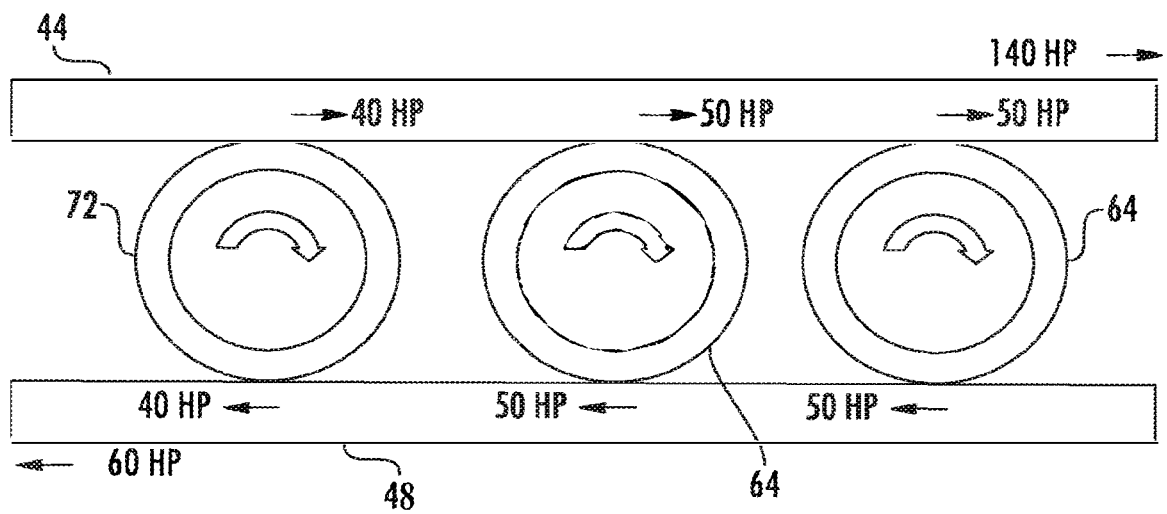
FIG. 6 is another schematic view of operation of an embodiment of a gearbox.

Referring now to FIG. 6, in other operating conditions, it is desired to have a differential between the torque transmitted to the upper drive gear 44 and the torque transmitted to the lower drive gear 48. Such operating conditions include commands for yaw of the aircraft 10. For example, under a yaw command, 140 HP of torque may be transferred to the upper drive gear 44, while 60 HP of torque may be transferred to the lower drive gear 48. The torque differential, 80 HP is transferred from the upper drive gear 44 and lower drive gear 48 to the idler pinion 72. It is to be appreciated that while one idler pinion 72 is shown in the present figures, additional idler pinions 72 may be utilized. These additional idler pinions 72 may be utilized to extract power from the drive gears 44, 48 to power accessories or other components, such as the translational thrust system 40.

Further, while described in the context of a single engine 24, it is understood that in other aspects, multiple engines can be used which would increase the number of pinions 64, 72 accordingly.

The gearbox 36 configurations described herein provide a low profile output stage with upper drive gear 44 and lower drive gear 48, thus reducing an overall height of the gearbox 36. The drive gears 44, 48 further provide for a potentially high reduction ratio. Further, with the idler pinion 72 utilized to transfer differential torque, the drive gears 44, 48 need not be designed to handle more than half of the driving load of the driving pinions 64, resulting in a potentially significant weight savings.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. By way of example, while described in terms of a coaxial helicopter, it is understood that aspects of the invention can be used in other types of aircraft, in industrial machinery, maritime or automotive machinery without limitation. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A gearbox system including a gearbox, the gearbox system comprising:
   a first drive gear rotatable about an axis of rotation;
   a second drive gear disposed coaxial with the first drive gear and rotatable about the axis of rotation;
   an input shaft providing a first torque and including an input gear;
   driving pinions operably connected to the input gear and disposed between the first drive gear and the second drive gear, the driving pinions are positioned cantilevered between the first and second drive gears and compliantly along a direction parallel to the axis of rotation, each driving pinion driving the first drive gear in a first direction about the axis of rotation and driving the second drive gear in a second direction opposite the first direction about the axis of rotation, each driving pinion transferring an equal second torque to the first drive gear and the second drive gear; and
   an idler pinion fixedly mounted to the gearbox, the idler pinion disposed between and engaged with the first drive gear and the second drive gear, the idler pinion configured to transfer a differential torque between a torque transferred to the first drive gear and a torque transferred to the second drive gear.

2. The gearbox system of claim 1, wherein the idler pinion is configured to ensure that the first drive gear and the second drive gear rotate at a same rotational speed about the axis of rotation.

3. The gearbox system of claim 1, further comprising one or more transfer shafts operably connected to the input shaft and each of the first drive gear and the second drive gear, each transfer shaft including:
   a transfer gear meshed with the input gear; and
   a driving pinion operably connected to the transfer gear.

4. The gearbox system of claim 1, wherein the first drive gear and the second drive gear are face gears.

5. A drive system for a dual coaxial counter rotating assembly, the drive system comprising:
   an engine outputting a first torque via an input shaft;
   a gearbox assembly operably connected to the input shaft including:
      a gearbox;
      a first drive gear rotatable about an axis of rotation to drive a first rotating assembly about the axis of rotation;
      a second drive gear disposed coaxial with the first drive gear and rotatable about the axis of rotation to drive a second rotating assembly about the axis of rotation;
      driving pinions operably connected to the input shaft and disposed between the first drive gear and the second drive gear, the driving pinions are positioned cantilevered between the first and second drive gears and compliantly along a direction parallel to the axis of rotation, each driving pinion driving the first drive gear in a first direction about the axis of rotation and driving the second drive gear in a second direction opposite the first direction about the axis of rotation, each driving pinion transferring an equal second torque to the first drive gear and the second drive gear;

an idler pinion fixedly mounted to the gearbox, the idler pinion disposed between and engaged with the first drive gear and the second drive gear, the idler pinion configured to transfer a differential torque between a torque transferred to the first drive gear and a torque transferred to the second drive gear.

6. The drive system of claim 5, wherein the idler pinion is configured to ensure that the first drive gear and the second drive gear rotate at a same rotational speed about the axis of rotation.

7. The drive system of claim 5, further comprising one or more transfer shafts operably connected to the input shaft and each of the first drive gear and the second drive gear, each transfer shaft including:
   a transfer gear meshed with the input gear; and
   a driving pinion operably connected to the transfer gear.

8. The drive system of claim 5, wherein the first drive gear and the second drive gear are face gears.

9. A rotary wing aircraft comprising:
   an airframe;
   a rotor assembly including:
      a first rotor rotatable about a rotor axis in a first direction; and
      a second rotor coaxial with the first rotor and rotatable about the rotor axis in a second direction opposite the first direction; and
      a drive system including:
         an engine outputting a first torque via an input shaft;
         a gearbox assembly operably connected to the input shaft including:
            a gear box;
            a first drive gear rotatable about the rotor axis to drive the first rotor about the rotor axis;
            a second drive gear disposed coaxial with the first drive gear and rotatable about the rotor axis to drive the second rotor about the rotor axis;
            at least one driving pinion operably connected to the input shaft and disposed cantilevered between the first drive gear and the second drive gear compliantly along a direction parallel to the axis of rotation, each driving pinion driving the first drive gear in a first direction about the axis of rotation and driving the second drive gear in a second direction opposite the first direction about the axis of rotation, each driving pinion transferring an equal second torque to the first drive gear and the second drive gear; and
            an idler pinion fixedly mounted to the gearbox, the idler pinion disposed between and engaged with the first drive gear and the second drive gear to transfer a differential torque between a first torque transferred to the first drive gear and a second torque transferred to the second drive gear.

10. The aircraft of claim 9, wherein the idler pinion is configured to extract power from the first drive gear and second drive gear to power a translation thrust system of the aircraft.

11. The aircraft of claim 9, further comprising one or more transfer shafts operably connected to the input shaft and each of the first drive gear and the second drive gear, each transfer shaft including:
   a transfer gear meshed with the input gear; and
   a driving pinion operably connected to the transfer gear.

* * * * *